US012670120B2

(12) United States Patent
Smith et al.

(10) Patent No.: US 12,670,120 B2
(45) Date of Patent: Jun. 30, 2026

(54) FEDERATED DISCOVERY CONTROLLER

(71) Applicant: DELL PRODUCTS L.P., Round Rock, TX (US)

(72) Inventors: Erik Smith, Douglas, MA (US); Pawan Kumar Singal, Milpitas, CA (US); Joseph LaSalle White, San Jose, CA (US); Balaji Rajagopalan, Sunnyvale, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 380 days.

(21) Appl. No.: 18/335,987

(22) Filed: Jun. 15, 2023

(65) Prior Publication Data

US 2024/0419625 A1     Dec. 19, 2024

(51) Int. Cl.
| | |
|---|---|
| *G06F 15/17* | (2006.01) |
| *G06F 9/54* | (2006.01) |
| *G06F 15/173* | (2006.01) |

(52) U.S. Cl.
CPC ........ *G06F 15/17331* (2013.01); *G06F 9/542* (2013.01)

(58) Field of Classification Search
CPC .... G06F 15/17331; G06F 9/542; G06F 9/547; H04L 67/1097; H04L 67/51
USPC ........................................ 719/318
See application file for complete search history.

(56) References Cited

U.S. PATENT DOCUMENTS

| | | |
|---|---|---|
| 6,625,625 B1 | 9/2003 | Kihara et al. |
| 7,185,334 B2 | 2/2007 | Bourke-Dunphy |
| 7,697,920 B1 | 4/2010 | Mcclain |
| 8,375,014 B1 | 2/2013 | Brocato |
| 9,384,093 B1 | 7/2016 | Aiello |
| 9,516,108 B1 | 12/2016 | Sullivan |
| 10,225,138 B2 | 3/2019 | Wu |
| 10,372,926 B1 | 8/2019 | Leshinsky |
| 10,445,229 B1 | 10/2019 | Kuzmin et al. |
| 10,771,340 B2 | 9/2020 | Ballapuram |
| 10,877,669 B1 | 12/2020 | Sivasubramanian |
| 11,237,997 B2 | 2/2022 | Smith et al. |

(Continued)

OTHER PUBLICATIONS

Claudio DeSanti, "Subsystem Driven Zoning with Pull Registration Model," nvm Express, Feb. 1, 2022. (8pgs).

(Continued)

*Primary Examiner* — Tuan C Dao
(74) *Attorney, Agent, or Firm* — BAUGH LAW, LLC

(57)     ABSTRACT

Embodiments presented herein address issues related to discovery controller collaboration in multi-cloud operating environments, in which a resource storage system and a destination storage system may not be managed by the same team or process. Therefore, providing a single Centralized Discovery Controller (CDC) that can be directly utilized by both the source and destination may not be possible. To address the multi-datacenter configuration concerns, embodiments of a Federated Discovery Controller (FDC) are disclosed. In one or more embodiments, an FDC comprises a primary CDC (PCDC) and one or more non-primary Discovery Controllers (NDCs). After initial configuration and connection establishment, a bi-directional connection between the PCDC and each NDC may be established for desired namespace discovery and storage capacity utilization across different Discovery Controllers.

20 Claims, 10 Drawing Sheets

*400*

Installing a PCDC on a first location and instantiating with a PCDC IP Address ⎯ *405*

Installing one or more NDCs on one or more locations respectively with each NDC instantiated with an NDC IP Address ⎯ *410*

Configuring each NDC to set a scope of sharing regarding end-devices connected to the NDC ⎯ *415*

Configuring each NDC for an entry of the PCDC IP Address used for connection to the PCDC ⎯ *420*

(56) References Cited

U.S. PATENT DOCUMENTS

| | | | |
|---|---|---|---|
| 11,323,355 B1 | 5/2022 | Gupta | |
| 11,442,652 B1 | 9/2022 | Dailey | |
| 11,451,470 B2 | 9/2022 | Power | |
| 11,487,690 B2 | 11/2022 | Puttagunta et al. | |
| 11,489,723 B2 | 11/2022 | Smith | |
| 11,520,518 B2 | 12/2022 | Desanti | |
| 11,526,283 B1 | 12/2022 | Mallick et al. | |
| 11,543,966 B1 | 1/2023 | Varghese | |
| 11,550,734 B1 | 1/2023 | Matosevich | |
| 11,579,808 B2 | 2/2023 | Satapathy | |
| 11,588,261 B2 | 2/2023 | Olarig et al. | |
| 11,614,970 B2 | 3/2023 | Huang | |
| 11,625,273 B1 | 4/2023 | Elhemali | |
| 11,640,245 B2 | 5/2023 | Rao et al. | |
| 11,651,066 B2 | 5/2023 | Levi et al. | |
| 11,675,499 B2 | 6/2023 | Dhatchinamoorthy | |
| 11,782,611 B2 | 10/2023 | Shachar et al. | |
| 11,805,171 B2 | 10/2023 | Smith | |
| 11,818,031 B2 | 11/2023 | Smith | |
| 11,822,545 B2 | 11/2023 | Cappiello | |
| 11,822,706 B2 | 11/2023 | Anchi et al. | |
| 11,907,530 B2 | 2/2024 | Desanti | |
| 11,928,365 B2 | 3/2024 | Anchi et al. | |
| 11,940,935 B2 | 3/2024 | Bar-Ilan et al. | |
| 12,026,402 B2 | 7/2024 | Paulchamy et al. | |
| 12,086,431 B1 | 9/2024 | Dreier et al. | |
| 12,088,470 B2 | 9/2024 | Radi et al. | |
| 12,105,989 B2 | 10/2024 | Desanti et al. | |
| 2001/0002912 A1* | 6/2001 | Tony | H04L 61/00 |
| | | | 370/537 |
| 2002/0016921 A1 | 2/2002 | Olsen | |
| 2003/0235206 A1* | 12/2003 | Heller | H04L 69/165 |
| | | | 370/467 |
| 2004/0097217 A1 | 5/2004 | Mcclain | |
| 2005/0071585 A1* | 3/2005 | Hayardeny | G06F 11/2069 |
| | | | 714/E11.107 |
| 2005/0271055 A1* | 12/2005 | Stupka | H04L 65/1066 |
| | | | 370/389 |
| 2006/0242320 A1 | 10/2006 | Nettle et al. | |
| 2007/0299880 A1 | 12/2007 | Kawabe et al. | |
| 2009/0225351 A1 | 9/2009 | Lacagnina | |
| 2010/0199330 A1 | 8/2010 | Schott et al. | |
| 2012/0254554 A1 | 10/2012 | Nakajima | |
| 2013/0196656 A1* | 8/2013 | Liu | H04W 8/06 |
| | | | 455/433 |
| 2013/0238636 A1* | 9/2013 | Subramanya | G06F 16/3322 |
| | | | 707/767 |
| 2013/0247223 A1* | 9/2013 | Park | H04L 63/10 |
| | | | 726/28 |
| 2013/0297835 A1 | 11/2013 | Cho | |
| 2015/0038076 A1 | 2/2015 | Naruse | |
| 2016/0241659 A1 | 8/2016 | Wessendorf | |
| 2017/0048322 A1 | 2/2017 | Desanti | |
| 2017/0315522 A1 | 11/2017 | Kwon et al. | |
| 2018/0052704 A1* | 2/2018 | Ohnishi | G06F 9/45558 |
| 2018/0074717 A1 | 3/2018 | Olarig | |
| 2018/0074984 A1 | 3/2018 | Olarig | |
| 2018/0084051 A1* | 3/2018 | Trachy | G06F 11/1461 |
| 2018/0270119 A1 | 9/2018 | Ballapuram | |
| 2019/0020603 A1 | 1/2019 | Subramani | |
| 2019/0037033 A1 | 1/2019 | Khakimov et al. | |
| 2019/0042144 A1 | 2/2019 | Peterson | |
| 2019/0047841 A1 | 2/2019 | Chang | |
| 2019/0245924 A1 | 8/2019 | Li | |
| 2019/0318734 A1 | 10/2019 | Nair | |
| 2019/0332766 A1 | 10/2019 | Guri | |
| 2019/0334949 A1 | 10/2019 | Guri | |
| 2020/0065269 A1 | 2/2020 | Balasubramani et al. | |
| 2020/0081640 A1 | 3/2020 | Enz et al. | |
| 2020/0136996 A1 | 4/2020 | Li | |
| 2020/0159421 A1* | 5/2020 | Karumbunathan | |
| | | | G06F 9/45558 |
| 2020/0310657 A1 | 10/2020 | Cayton et al. | |
| 2020/0319812 A1 | 10/2020 | He et al. | |
| 2020/0329074 A1* | 10/2020 | Everhart | H04L 12/1895 |
| 2020/0349094 A1 | 11/2020 | Smith et al. | |
| 2020/0409583 A1* | 12/2020 | Kusters | G06F 11/1612 |
| 2020/0409893 A1 | 12/2020 | Puttagunta | |
| 2021/0019272 A1 | 1/2021 | Olarig et al. | |
| 2021/0028987 A1 | 1/2021 | Krivenok | |
| 2021/0037105 A1 | 2/2021 | Smith-Denny | |
| 2021/0064281 A1 | 3/2021 | Satapathy et al. | |
| 2021/0117249 A1* | 4/2021 | Doshi | G06F 9/5077 |
| 2021/0124695 A1 | 4/2021 | Jaiswal et al. | |
| 2021/0126861 A1 | 4/2021 | Rajendiran et al. | |
| 2021/0185039 A1* | 6/2021 | Huang | H04W 12/08 |
| 2021/0263686 A1 | 8/2021 | Satapathy et al. | |
| 2021/0263762 A1 | 8/2021 | Kachare et al. | |
| 2021/0286540 A1 | 9/2021 | Tylik | |
| 2021/0286741 A1 | 9/2021 | Smith et al. | |
| 2021/0286745 A1 | 9/2021 | Smith | |
| 2021/0288878 A1 | 9/2021 | Smith | |
| 2021/0289027 A1 | 9/2021 | Smith | |
| 2021/0289029 A1 | 9/2021 | Smith | |
| 2021/0311899 A1 | 10/2021 | Smith | |
| 2021/0391988 A1 | 12/2021 | Bedau | |
| 2021/0397351 A1 | 12/2021 | Dhatchinamoorthy et al. | |
| 2022/0014592 A1 | 1/2022 | Kachare | |
| 2022/0027076 A1 | 1/2022 | Reichbach | |
| 2022/0030062 A1* | 1/2022 | Jennings | H04L 67/1097 |
| 2022/0050797 A1* | 2/2022 | Dreier | G06F 12/023 |
| 2022/0066670 A1* | 3/2022 | Naik | G06F 3/0641 |
| 2022/0066799 A1 | 3/2022 | Pinto | |
| 2022/0075539 A1* | 3/2022 | Juch | G06F 3/0605 |
| 2022/0174094 A1 | 6/2022 | Subbiah et al. | |
| 2022/0237274 A1 | 7/2022 | Paul | |
| 2022/0286377 A1 | 9/2022 | Smith | |
| 2022/0286508 A1 | 9/2022 | Smith | |
| 2023/0035799 A1 | 2/2023 | Desanti | |
| 2023/0283666 A1* | 9/2023 | Karr | G06F 16/27 |
| | | | 709/203 |
| 2023/0305700 A1 | 9/2023 | Desanti | |
| 2023/0325200 A1 | 10/2023 | Desanti | |
| 2023/0353462 A1* | 11/2023 | Cho | H04L 41/122 |
| 2024/0020055 A1 | 1/2024 | Desanti | |
| 2024/0020056 A1 | 1/2024 | Desanti | |
| 2024/0020057 A1 | 1/2024 | Paulchamy | |
| 2025/0293876 A1* | 9/2025 | Kar | H04L 9/0894 |

OTHER PUBLICATIONS

Office Action received Nov. 9, 2023, in the related matter, U.S. Appl. No. 17/863,300. (18pgs).

Non-Final Office Action (2580), including List of Ref., dated Jul. 25, 2025, in U.S. Appl. No. 17/863,300 (52 pgs).

Notice of Allowance & Fee(s) Due mailed Aug. 7, 2025, U.S. Appl. No. 18/786,533. (37 pgs).

Office Action received Mar. 14, 2024, in the related matter, U.S. Appl. No. 17/863,263. (25pgs).

"NVMe-oF™: Discovery Automation for NVMe® IP-based SANs," SNIA NSF Networking Storage, Nov. 2021. (49pgs).

Office Action received Oct. 26, 2023, in the related matter, U.S. Appl. No. 17/699,005. (10pgs).

Notice of Allowance & Fee(s) Due received Apr. 29, 2024, in the related matter, U.S. Appl. No. 17/699,005. (11pgs).

Non-Final Office Action (2580), including List of Ref., dated May 22, 2025, in U.S. Appl. No. 17/863,300 (19 pgs).

Notice of Allowance (2578), including List of References, dated May 21, 2025, in U.S. Appl. No. 17/863,263 (33 pgs).

Response filed Feb. 9, 2024, in the related matter, U.S. Appl. No. 17/863,300. (16pgs).

Response filed Jun. 6, 2024, in the related matter, U.S. Appl. No. 17/863,300. (14pgs).

Response filed Jun. 7, 2024, in the related matter, U.S. Appl. No. 17/863,263. (16pgs).

Notice of Allowance & Fee(s) Due received Jun. 25, 2024, in the related matter, U.S. Appl. No. 17/863,277. (5 pgs).

Office Action received Jan. 24, 2024, in the related matter, U.S. Appl. No. 17/863,277. (15pgs).

(56) References Cited

OTHER PUBLICATIONS

Response filed Nov. 28, 2023, in the related matter, U.S. Appl. No. 17/699,005. (11pgs).
Notice of Allowance & Fee(s) Due received Jan. 8, 2024, in the related matter, U.S. Appl. No. 17/699,005. (10pgs).
Erik Smith, "NVM Express Technical Proposal for New Feature," nvm Express, Dell EMC, Jan. 11, 2022. (9 pgs).
Erik Smith et al., "NVM Express Technical Proposal (TP) 8010," nvm Express, Jan. 12, 2022. (82 pgs).
Erik Smith et al., "NVM Express Technical Proposal (TP) 8010a," nvm Express, May 9, 2022. (80 pgs).
"FC and FCoE versus iSCSI—"Network-centric" versus "End-Node-centric" provisioning," [online], [Retrieved Oct. 12, 2020]. Retrieved from Internet (6pgs).
"Hard zoning versus soft zoning in a FC/FCoE SAN," [online], [Retrieved Oct. 12, 2020] Retrieved from Internet (5pgs).
"NVM Express Base Specification," revision 1.4, Jun. 10, 2019, [online], [Retrieved Oct. 12, 2020] Retrieved from Internet (403pgs).
"NVM Express Over Fabrics," revision 1.0, ratified May 31, 2016, [online], [Retrieved Oct. 12, 2020] Retrieved from Internet (49pgs).
"NVMe over Fabrics' Discovery problem," [online], [Retrieved Oct. 12, 2020] Retrieved from Internet (2pgs).
INCITS 548-2020, Information Technology—Fibre Channel—Generic Services—8 (FC-GS-8), American National Standard for Information Technology, 2020 (431 pages).

Notice of Allowance & Fee(s) Due received Dec. 10, 2024, U.S. Appl. No. 17/863,277. (5 pgs).
Notice of Allowance & Fee(s) Due received Dec. 18, 2024, U.S. Appl. No. 17/863,263. (10 pgs).
Notice of Allowance and Fee(s) Due, mailed Mar. 4, 2025, U.S. Appl. No. 17/863,300. (5pgs).
NVM Express Over Fabrics, revision 1.1, Oct. 22, 2019, [online], [Retrieved Oct. 12, 2020] Retrieved from Internet <URL:http://nvmexpress.org> (83pgs).
Office Action mailed Sep. 12, 2024, U.S. Appl. No. 17/863,263. (25pgs).
Office Action received Oct. 24, 2024, U.S. Appl. No. 17/863,300. (24pgs).
Response filed Jan. 24, 2025, U.S. Appl. No. 17/863,300. (12pgs).
Response filed Sep. 3, 2024, U.S. Appl. No. 17/863,300. (12pgs).
Response filed Apr. 9, 2024, U.S. Appl. No. 17/863,277. (14pgs).
Notice of Allowance & Fee(s) Due received Dec. 28, 2023, in the related matter, U.S. Appl. No. 17/865,244. (30pgs).
NVM Express TM over Fabrics , Revision 1.1 a, Jul. 12, 2021, [online], [Retrieved Jan. 12, 2024]. Retrieved from Internet <URL: https://nvmexpress.org/wp-content/uploads/NVMe-over-Fabrics-1.1a-2021.07.12-Ratified.pdf.> 2021. (84 pgs).
Office Action received Mar. 6, 2024, in the related matter, U.S. Appl. No. 17/863,300. (23pgs).
Final Office Action received Jul. 3, 2024, in the related matter, U.S. Appl. No. 17/863,300. (19pgs).
Notice of Allowance & Fee(s) Due mailed Nov. 11, 2025, U.S. Appl. No. 18/786,533. (17 pgs).

* cited by examiner

100

① Host and subsystem automatically discover the CDC, connect to it, and register discovery info ② Zoning performed on CDC (optional)

③ Storage admin provisions namespaces to the Host NQN. Storage may send zoning info to CDC ④ After zoning, Host received AEN, uses get log page, and connects to each IO controller ⑤ Repeat 1-2 for each Host on each subsystem

_400_

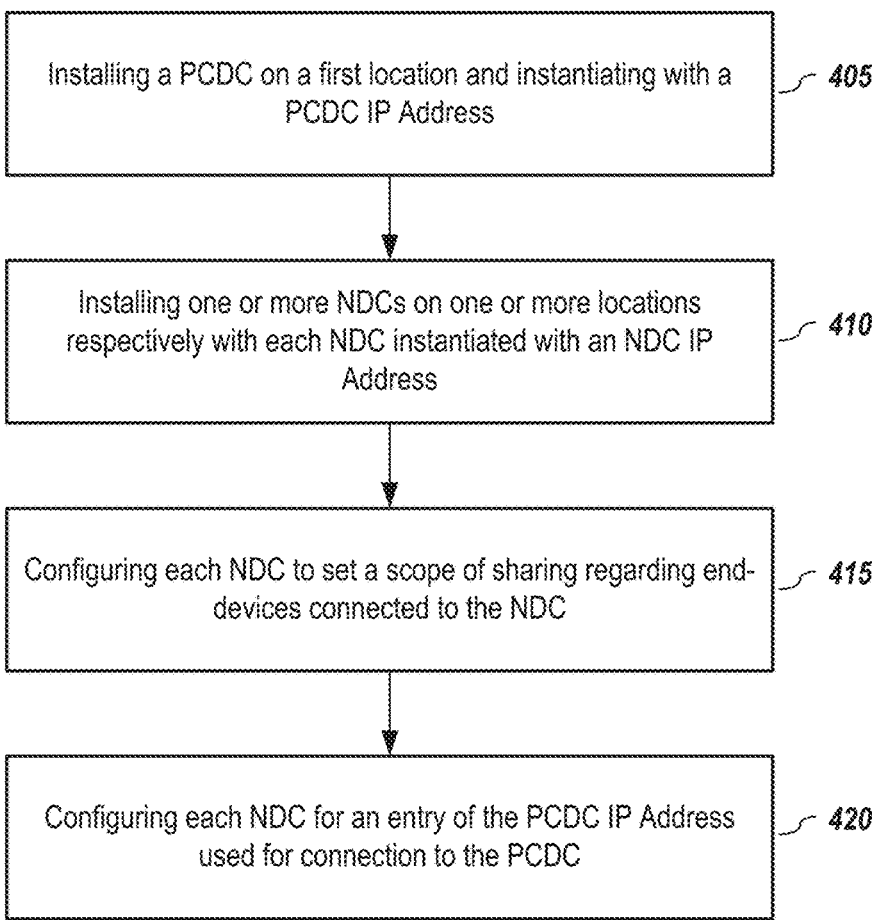

Installing a PCDC on a first location and instantiating with a PCDC IP Address    — 405

Installing one or more NDCs on one or more locations respectively with each NDC instantiated with an NDC IP Address    — 410

Configuring each NDC to set a scope of sharing regarding end-devices connected to the NDC    — 415

Configuring each NDC for an entry of the PCDC IP Address used for connection to the PCDC    — 420

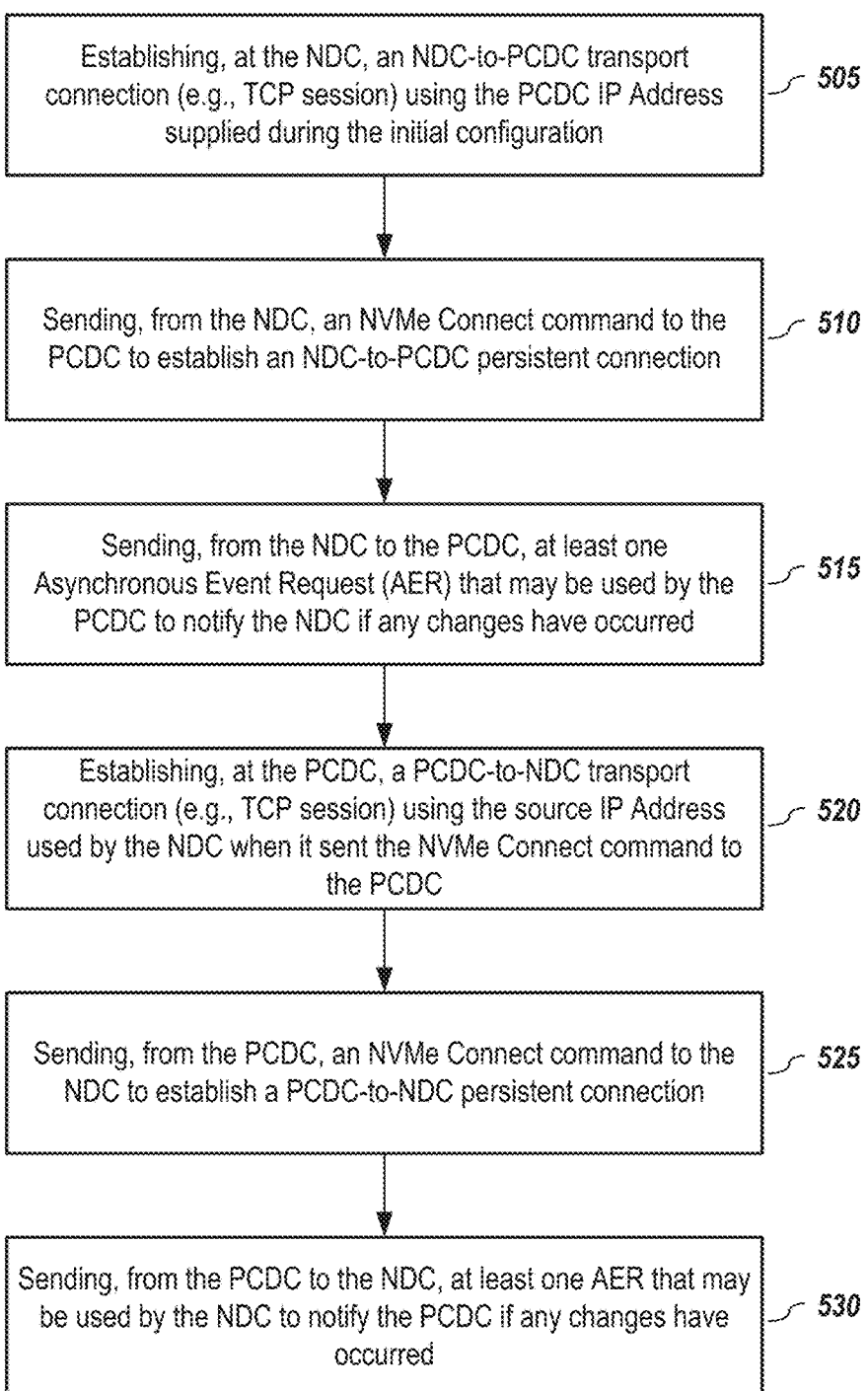

Establishing, at the NDC, an NDC-to-PCDC transport connection (e.g., TCP session) using the PCDC IP Address supplied during the initial configuration ⌐ 505

Sending, from the NDC, an NVMe Connect command to the PCDC to establish an NDC-to-PCDC persistent connection ⌐ 510

Sending, from the NDC to the PCDC, at least one Asynchronous Event Request (AER) that may be used by the PCDC to notify the NDC if any changes have occurred ⌐ 515

Establishing, at the PCDC, a PCDC-to-NDC transport connection (e.g., TCP session) using the source IP Address used by the NDC when it sent the NVMe Connect command to the PCDC ⌐ 520

Sending, from the PCDC, an NVMe Connect command to the NDC to establish a PCDC-to-NDC persistent connection ⌐ 525

Sending, from the PCDC to the NDC, at least one AER that may be used by the NDC to notify the PCDC if any changes have occurred ⌐ 530

FEDERATED DISCOVERY CONTROLLER

BACKGROUND

A. Technical Field

The present disclosure relates generally to information handling systems. More particularly, the present disclosure relates to multiple discovery controllers in collaboration to allow resources in different physical locations to be utilized as a part of a single system.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a multi-cloud operating environment, a customer may decide to upload a particular set of data from an array located in a colocation facility (also known as Colo), e.g., Equinix, to a cloud service provider (CSP), e.g., Amazon Web Services (AWS), and then perform some analysis on the particular data set using AWS Elastic Compute Cloud (EC2) instances. Before the data can be pushed from the "source" storage system in the Colo to the "destination" storage system in the CSP, the systems need to discover one another and establish connections using a transport specific mechanism.

However, the Colo and CSP environments may not be managed by the same teams or processes. Each environment may be administered separately, therefore providing a single centralized discovery controller (CDC) that can be directly utilized by both the source and destination may not be possible.

Accordingly, it is highly desirable to find new, more efficient ways for multiple discovery controllers to work in collaboration to allow resources in different physical locations to be utilized as a part of a single system.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 4 depicts an initial configuration process for a federated discovery controller, according to embodiments of the present disclosure.

FIG. 5 depicts a process of establishing connections in a federated discovery controller, according to embodiments of the present disclosure.

DETAILED DESCRIPTION OF EMBODIMENTS

Figure 1:
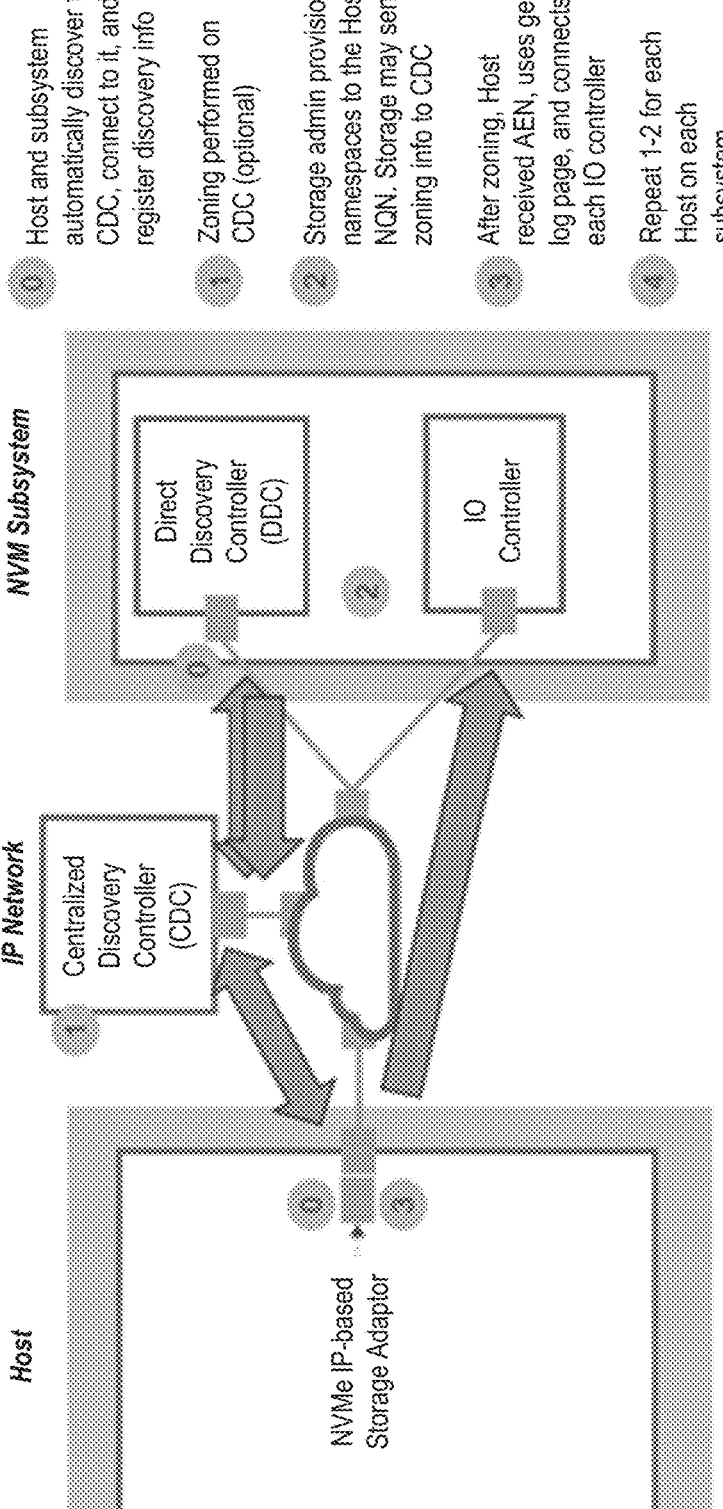
FIG. 1 graphically depicts automatic discovery using a CDC.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

A. Discovery of NVMe-oF Discovery Controllers

In multi-cloud operating environments, if a customer decides to use the Non-Volatile Memory express (NVMe)/Transmission Control Protocol (TCP) transport or any NVMe over Fabrics (NVMe-oF) transport to push data from a source storage system to a destination storage system, one of the storage systems involved needs to behave as a host (typically the source) and establishes a connection, and initiates data movement to the destination storage system, which normally acts as a subsystem.

Before the source can establish a connection to the destination, the source must be provided with transport-specific information needed to establish a connection. With NVMe/TCP, such transport-specific information comprises a subsystem NVMe Qualified Name (SUBNQN), an IP Address, and a TCP port of a transport interface on the destination subsystem.

The transport-specific information may be explicitly provided to the source by an administrative configuration or a Management and Orchestration (M&O) framework. The transport-specific information may also be automatically discovered using a combination of NVMe Technical Proposal TP8009 (Automatic discovery of NVMe-OF Discovery Controllers) and Technical Proposal TP8010 (NVMe-oF Centralized Discovery Controller), both of which are incorporated by reference herein in its entirety and for all purposes.

When the source storage system and the destination storage system are within confines of a single Data Center, one benefit of using TP8009 and TP8010 is that discovery only requires:

a. the host to discover a discovery controller (e.g., the CDC) on their subnet using multicast Domain Name System (mDNS) as described in TP8009;

b. retrieving a discovery log page (DLP) from the CDC, and c. connecting to any subsystem ports returned in the DLP.

A storage administrator may then use fabric zoning to control exactly which source and destination ports should be communicating with one another. FIG. 1 graphically depicts automatic discovery using a CDC. First, an NVMe IP-based storage adaptor in a host and a direct discovery controller (DDC) in an NVM subsystem automatically discover the CDC, connect to it, and register discovery information, as depicted in step ⓪ in FIG. 1. The CDC admin may optionally perform zoning operations to facilitate communication between the host and the NVM subsystem, as depicted in step ① in FIG. 1. Afterwards, a storage administrator provisions namespaces to the host NON and the NVM subsystem may also send zoning information to CDC, as depicted in step ② in FIG. 1. Zoning controls which IO Controllers the host should connect to. Accordingly, the host only connects to the IO Controllers that it has been allowed to access (in step ② in FIG. 1), instead of each (or all) IO controllers in the NVM subsystem. After zoning, the host receives an Asynchronous Event Notification (AEN), uses Get Log Page, and connects to each IO controller that the host has been allowed to visit, as depicted in step ③ in FIG. 1. Steps ①-② may be repeated for each host on each NVM subsystem.

Figure 2:
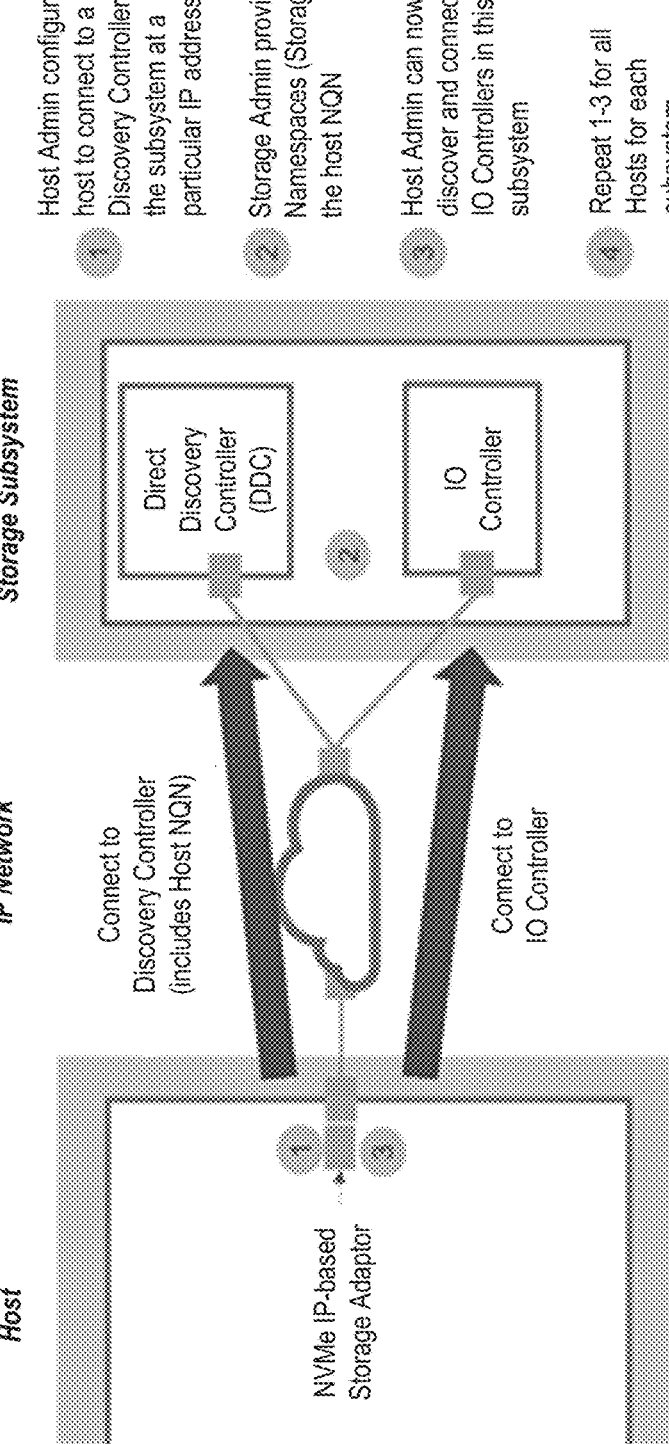
FIG. 2 graphically depicts an explicit configuration of connectivity information.

Without TP8009/TP8010, explicit configuration needs to be performed. Such a configuration process is tedious and error prone. FIG. 2 graphically depicts an explicit configuration of connectivity information. In step ①, a host administrator configures a host to connect to a discovery controller on a storage subsystem at a particular IP address. In step ②, a storage administrator provisions namespaces to the host NQN. In step ③, the host administrator discovers and connects to IO controllers on the storage subsystem. Steps ①-③ may be repeated for each host on each NVM subsystem.

Although the Centralized Discovery approach depicted in FIG. 1 may work very well inside a single Data Center, there are concerns when such an approach is utilized for a multi-datacenter configuration.

First, administrative domain separation must be maintained. One cannot assume that both the Colo and CSP environments are managed by the same team or process. Each environment may be administered separately. Therefore, providing a single CDC that can be directly utilized by both the source and destination may not be possible.

Second, TP8009 is based on mDNS, which does not cross subnet boundaries (i.e., is not routed). Therefore, this discovery approach does not function properly when the source subsystem, the destination subsystem, and the CDC are located on different subnets.

Third, there may be periodic loss of connectivity. A loss of connectivity between the source or destination environments and the CDC may result in losing functionality to either environment. For example, if there's a single CDC provided in the source environment, the destination environment may not be able to continue functioning if the destination internet connection goes down.

B. Federated Discovery Controller Embodiments

Figure 3:
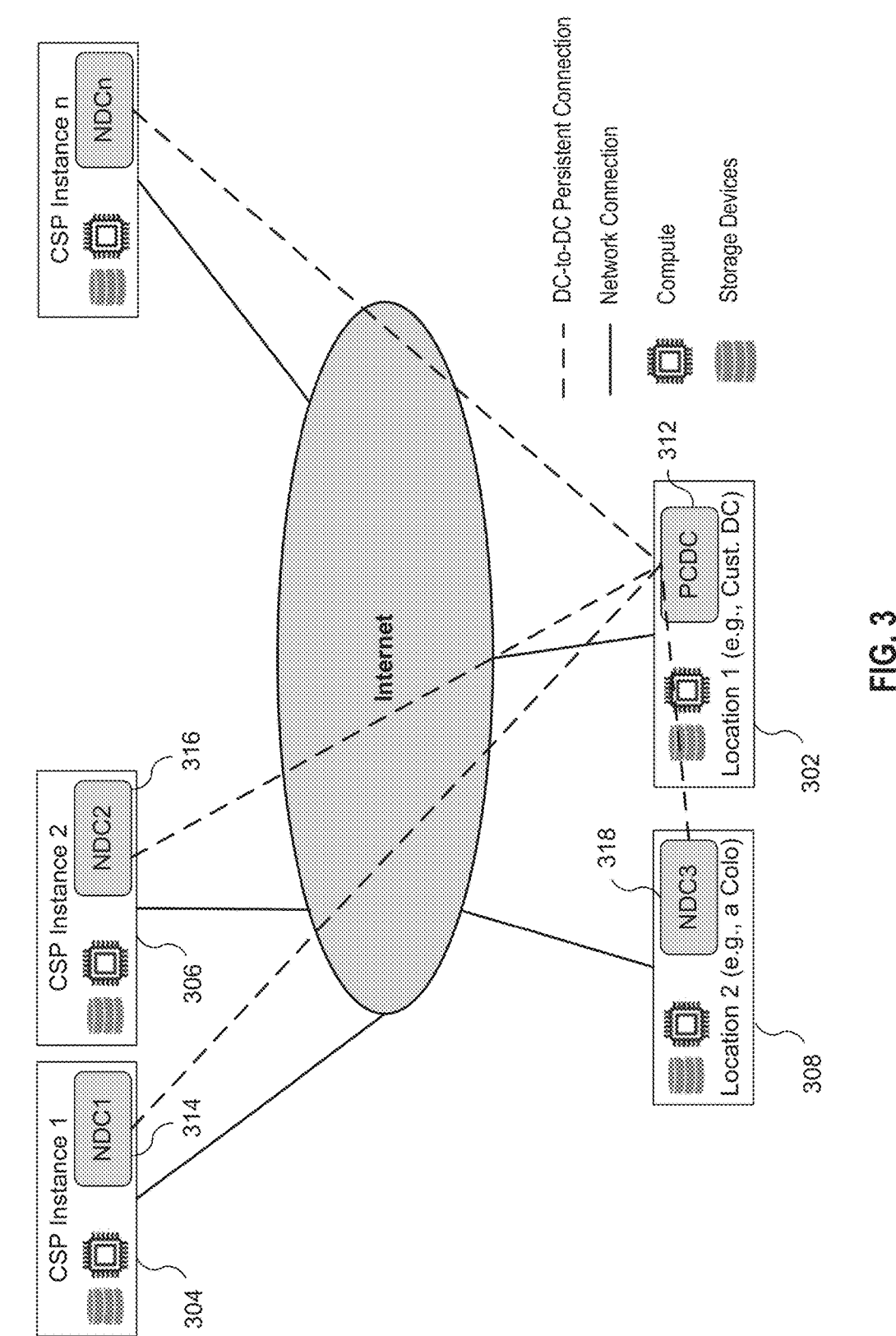
FIG. 3 graphically depicts a configuration for a federated discovery controller, according to embodiments of the present disclosure.

Described hereinafter are Federated Discovery Controller (FDC) embodiments to address the above-mentioned concerns for multi-datacenter configuration. FIG. 3 graphically depicts a configuration of a federated discovery controller, according to embodiments of the present disclosure. As shown in FIG. 3, a federated discovery controller comprises a primary centralized discovery controller (PCDC) 312 deployed in a first location (e.g., a customer's Data Center) and one or more non-primary discovery controllers (NDCs), which may also be referred to as a local discovery controller (LDC), deployed in places other than the first location. For example, a first NDC (NDC1) 314 is deployed in a first CSP instance 304, a second NDC (NDC2) 316 is deployed in a second CSP instance 306, and a third NDC (NDC3) 318 is deployed in a second location (e.g., a Colo) 308, et al. In one or more embodiments, each discovery controller (i.e., NDC or PCDC) is a centralized discovery controller (CDC) as described in NVMe Technical Proposal TP8010. The PCDC and NDCs operate in collaboration for implementing desired initial configuration, connection establishment and/or data movement, and are therefore referred collectively to as a federated discovery controller.

In one or more embodiments, to allow a bi-directional communication between discovery controllers, a PCDC and an NDC need to have two connections established. For communication that is initiated by the PCDC to the NDC, a connection where the PCDC acts as a host and the NDC acts as a controller is used. For communication that is initiated by the NDC to the PCDC, a connection where the NDC acts as a host and the PCDC acts as a controller is used. Once the bi-directional communication has been established, the PCDC and the NDC may exchange contents, including their name server databases.

1. Embodiments of Initial Configuration

FIG. 4 depicts a process of initial configuration for a federated discovery controller, according to embodiments of the present disclosure. In step 405, a PCDC is installed on a first location and instantiated with a PCDC IP Address for communication with other discovery controllers. In one or more embodiments, the first location for PCDC deployment is a customer's Data Center. In step 410, one or more NDCs are installed on one or more locations, respectively, with each NDC instantiated with an NDC IP Address for communication with other discovery controllers. In one or more embodiments, the one or more NDCs may be deployed in a Colo, CSPs, etc. In step 415, each NDC is configured to set a scope of sharing regarding end-devices connected to the NDC. The scope of sharing may be set, using a Name Server Synchronization policy, to None, All, or Selected. Setting the scope to None indicates that no name server entries will be shared from the NDC to the PCDC. Setting the scope to All indicates that all name server entries will be shared from the NDC to the PCDC. Setting the scope to Selected indicates that only name server entries that have been specifically selected for sharing will be shared from the NDC to the PCDC. In step 420, each NDC is configured for an entry of the PCDC IP Address that each NDC is used for connection to the PCDC. It is assumed that each NDC has one or more local entities (Host or Subsystems) connected to it, and the one or more local entities are visible to the NDC administrator as entries in a Name Server database.

2. Embodiments of Establishing Connection

After the NDC is configured, a connection between the NDC and the PCDC may be established using steps shown in FIG. 5. In step 505, an NDC-to-PCDC transport connection (e.g., TCP session) is established, at the NDC, using the PCDC IP Address supplied during the initial configuration. In step 510, once the NDC-to-PCDC transport connection has been established, the NDC sends an NVMe Connect command to the PCDC instance to establish an NDC-to-PCDC persistent connection. In step 515, the NDC sends to the PCDC at least one asynchronous event request (AER) that may be used by the PCDC to notify the NDC if any changes have occurred. Once the NDC-to-PCDC persistent connection is established and authentication has been performed (if required), the PCDC may perform a similar process with the NDC. In step 520, a PCDC-to-NDC transport connection (e.g., TCP session) is established, at the PCDC, using the source IP Address used by the NDC when it sent the NVMe Connect command to the PCDC. In step 525, once the PCDC-to-NDC transport connection is established, the PCDC sends an NVMe Connect command to the NDC to establish a PCDC-to-NDC persistent connection. In step 530, the PCDC sends to the NDC at least one AER that may be used by the NDC to notify the PCDC if any changes have occurred. Once the PCDC-to-NDC persistent connection has been established and authentication has been performed (if required), a bi-directional connection between PCDC and the NDC is established.

In one or more embodiments, the process in FIG. 5 may be implemented based on existing standards and be repeated between each NDC and the PCDC.

C. Embodiments of Name Server Database Synchronization

Once a bi-directional connection between a PCDC and an NDC has been established, the NDC and the PCDC may synchronize their name server databases. Such synchronization may be controlled by the Name Server Synchronization policy described above and may be accomplished using one of the following method embodiments:

a. The NDC sends the PCDC a discovery information management (DIM) command that contains Host and Subsystems entries being shared with the PCDC;

b. The NDC uses an AEN to notify the PCDC that an update to the Discovery Log Page has been made. The PCDC then uses Get Log Page (Discovery Log) to retrieve the name server entries being shared with the PCDC;

c. The NDC uses a North Bound Interface (NBI) of the PCDC instance to access the PCDC's Representational State Transfer (REST) application program interface (API) and add Name Server entries to the database via the REST API; and d. The NDC uses an NBI of the PCDC instance and uses a remote procedure call, e.g., Google Remote Procedure Call (gRPC), to add Name Server entries to a database.

In one or more embodiments, as the NDC processes additional connection requests from Hosts and Subsystems, and adds additional entries to its Name Server database, it may notify the PCDC of any changes to the Discovery Log Page using the same process as above. Among the above four method embodiments, the method of using a DIM command to the PCDC that contains the new name server entries may be the best mechanism. For the method of using AEN to notify the PCDC of the change and then using Get Log Page, the PCDC may have to parse the Get Log Page response from each NCD.

D. Embodiments of Zoning Updates

In one or more embodiments, an NDC administrator, e.g., the administrator who manages the NDC instance in the Colo or in the CSP, controls which local entity or entities, e.g., Hosts or Subsystems located within the Colo or CSP, are exposed to the PCDC. If a local entity is not exposed to the PCDC, the NDC admin retains complete control of connectivity for that entity (i.e., via zoning). The PCDC administrator, e.g., the administrator who manages the PCDC instance in the Customer's Data Center, controls connectivity between any local entities as well as connectivity between Colo and CSP resources that have been exposed by each NDC.

In one or more embodiments, zoning updates on the NDC that do not impact the PCDC may be considered local changes and require no external communication between the NDC and the PCDC. The same may also be applicable for zoning updates on the PCDC that do not impact any NDCs.

Zoning updates on the PCDC that impact connectivity between resources in the CSP or Colo to another resource in the CSP, Colo, or the Customer's Data Center are sent to impacted NDC instances and may result in name server entries being shared between NDC instances if not already present.

Figure 6:
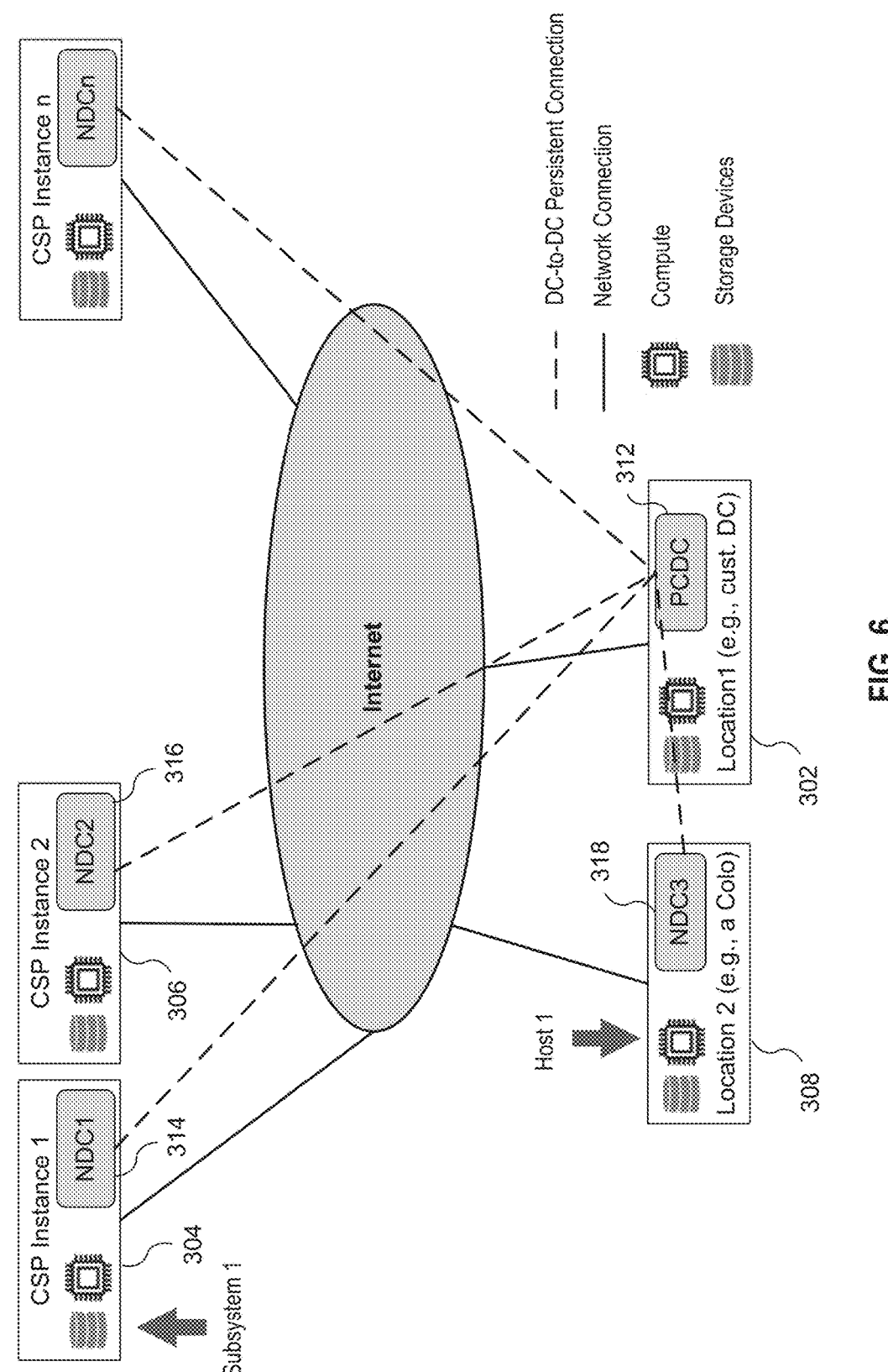
FIG. 6 graphically depicts host and storage connectivity establishment, according to embodiments of the present disclosure.

FIG. 6 graphically depicts host and storage connectivity establishment, according to embodiments of the present disclosure. Upon the completion of initial configuration, connection establishing, and zoning, an NDC deployed in a source location and another NDC deployed in a destination location may be connected via the PCDC for desired data movement. The NDC in the source location (e.g., location 308 in FIG. 6) functions as a host, and the NDC in the destination location (e.g., the first CSP instance 304 in FIG. 6) functions as a subsystem.

E. Embodiments of Connectivity Sequences

Figure 7:
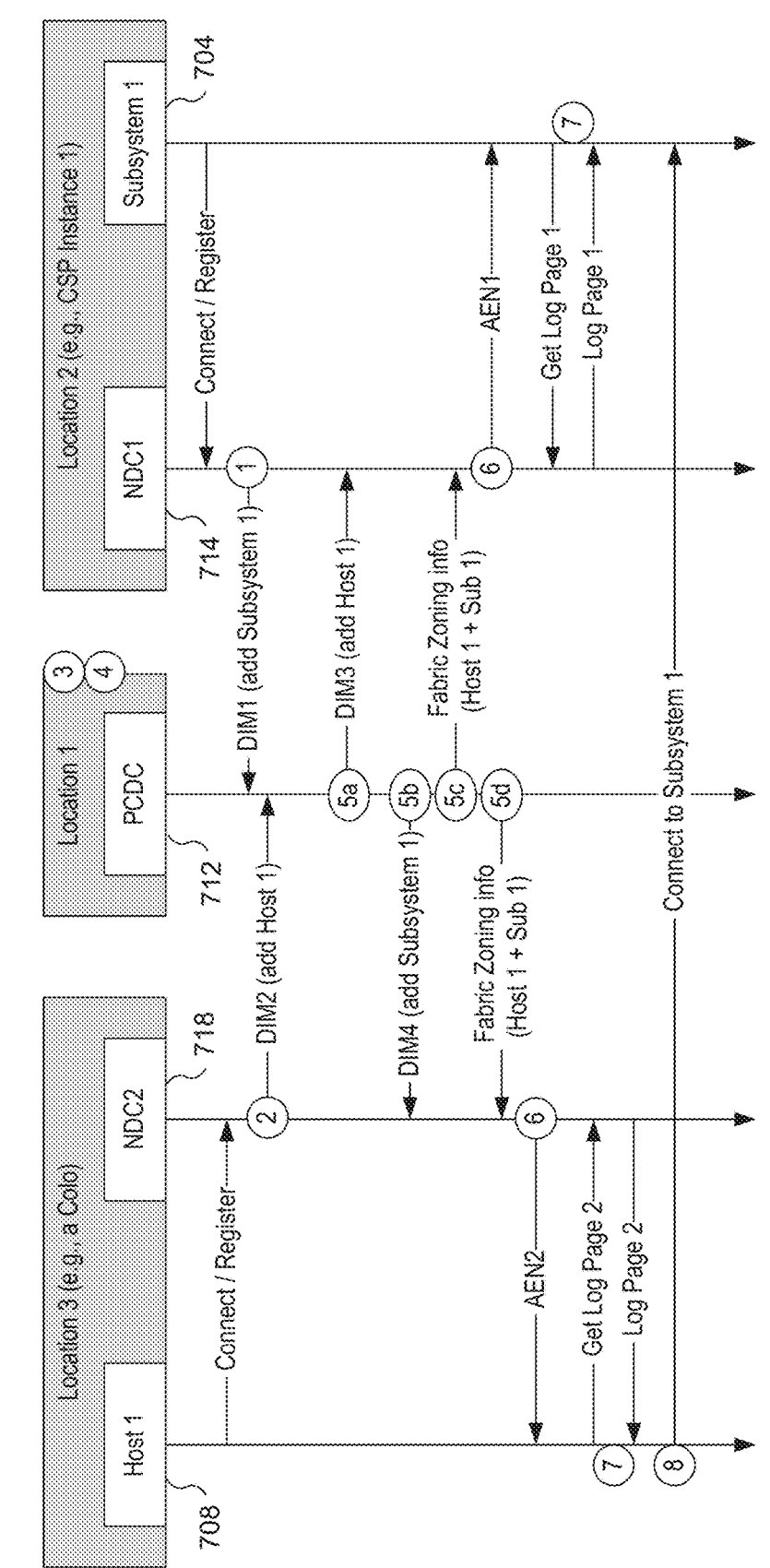
FIG. 7 depicts a connectivity sequence diagram, according to embodiments of the present disclosure.
Figure 8:
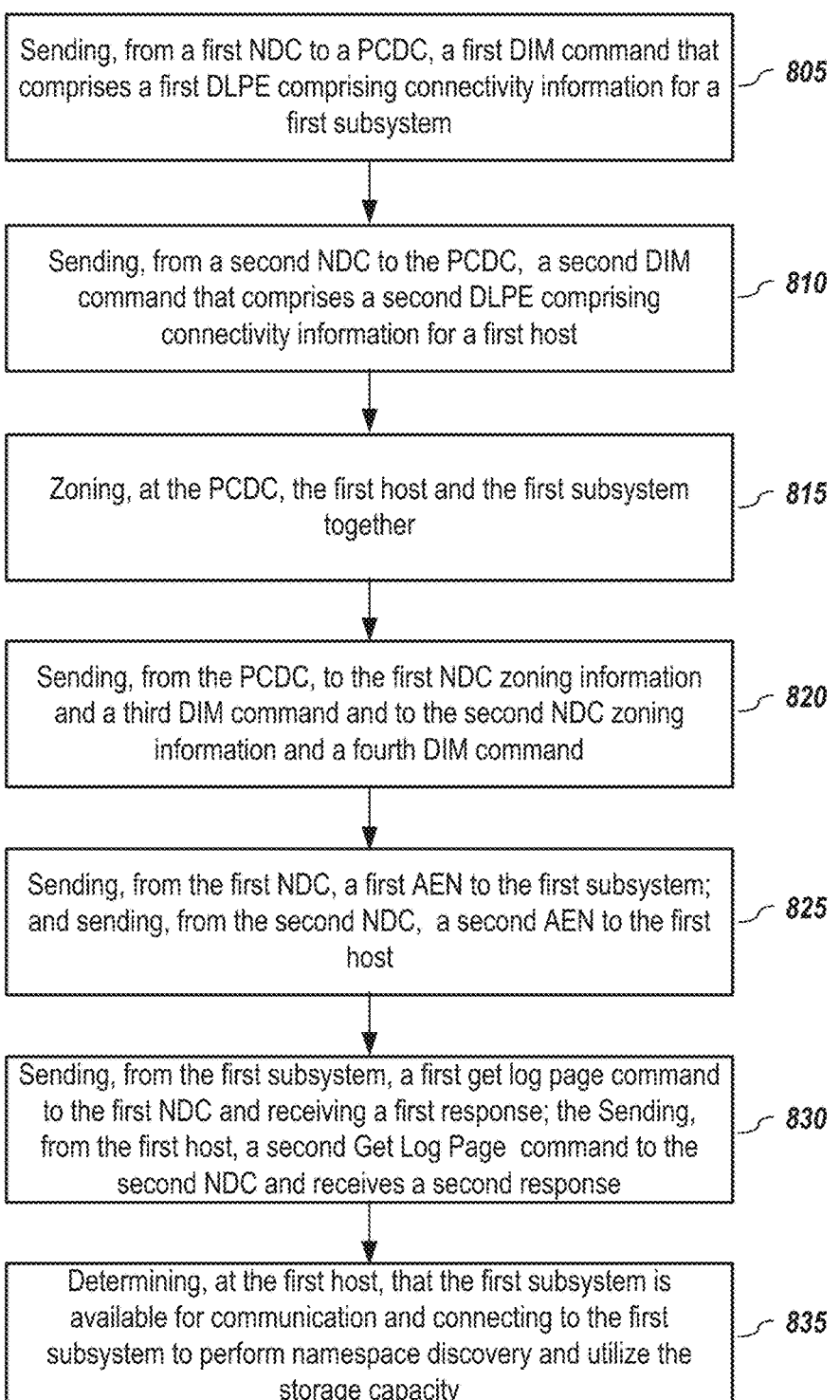
FIG. 8 depicts a connectivity establishment process in a federated discovery controller, according to embodiments of the present disclosure.

FIG. 7 and FIG. 8 respectively depict a connectivity sequence diagram and a process for implementing connectivity, according to embodiments of the present disclosure. Sequences or steps shown in FIG. 7 and FIG. 8 may be implemented after completion of initial configuration (shown in FIG. 4) and bi-directional PCDC-NDC connection establishment (shown in FIG. 5).

As shown in FIG. 7, a PCDC 712 is deployed and instantiated at a first location (Location 1), e.g., a customer data center, a first NDC (NDC1) 714 is deployed and instantiated at a second location (Location 2), e.g., a CSP instance, and a second NDC (NDC2) 718 is deployed and instantiated at a third location (Location 3), e.g., a Colo. Location 1 is a destination location, and Location 3 is a source location for data storage transfer. In this case, the location with Host 1 (Location 3) is the source with the subsystem in this location 3 acting as a host for connectivity purposes, and the subsystem 704 in Location 2 is the destination. A first host 708 at the third location is connected and registered to the second NDC 718, and a first subsystem 704 is connected and registered to the first NDC 714.

In step 805 (also graphically indicated as process ① in FIG. 7), an administrator for the first NDC (NDC1) decides to expose the first subsystem 704 to the PCDC. In response, the first NDC sends to the PCDC a first discovery information management (DIM) command that comprises a first Discovery Log Page Entry (DLPE) comprising connectivity information for the first subsystem.

In step 810 (also graphically indicated as process ② in FIG. 7), an administrator for the second NDC decides to expose the first host to the PCDC. In response, the second NDC sends a second DIM command that comprises a second DLPE comprising connectivity information for the first host.

In step 815, the PCDC is now aware of the first host and the first subsystem after receiving the first and second DIM commands. As a result, the first host and the first subsystem are visible to the PCDC admin and may be zoned together by the PCDC. In one or more embodiments, the PCDC may create a first zone (zone 1) containing the first host and the first subsystem, create a first zone group (zone group 1) containing the first zone, and activate the first zone group. Such a step of zoning is graphically indicated as processes ③ and ④ in FIG. 7.

In step 820 (also graphically indicated as process ⑤ in FIG. 7), the PCDC performs:

a. sending to the first NDC a third DIM command containing connectivity information about the first host for the first NDC to store such connectivity information in NDC1's Name Server database;

b. sending to the second NDC a fourth DIM command containing connectivity information about the first subsystem for the second NDC to store such connectivity information in NDC2's Name Server database.

c. sending zoning information about the first zone group to the first NDC using one or more NVMe fabric zoning commands, e.g., FZL, FZS; and d. sending zoning information about the first zone group to the second NDC using one or more NVMe Fabric Zoning commands, e.g., FZL, FZS.

The sub-steps c and d (also graphically indicated as sub-processes 5c and 5d in FIG. 7) are related to zoning elements of NVMe hosts or NVM subsystems within an NVMe-oF environment, which is described in commonly-owned U.S. patent application Ser. No. 16/898,191, filed on 10 Jun. 2020 and patented on 1 Feb. 2022, entitled "TARGET DRIVEN ZONING FOR ETHERNET IN NON-VOLATILE MEMORY EXPRESS OVER-FABRICS (NVME-OF) ENVIRONMENTS," and listing Erik Smith, Joseph LaSalle White, David Black, and Raja Subbiah as inventors, which patent document is incorporated by reference herein in its entirety and for all purposes. The current patent document is also related to commonly-owned U.S. patent application Ser. No. 17/863,263, filed on 12 Jul. 2022, entitled "SYSTEMS AND METHODS FOR STORAGE SUBSYSTEM-DRIVEN ZONING FOR PULL MODEL DEVICES," and listing Claudio DeSanti as inventor, which patent document is incorporated by reference herein in its entirety and for all purposes; commonly-owned U.S. patent application Ser. No. 17/863,277, filed on 12 Jul. 2022, entitled "SYSTEMS AND METHODS FOR COMMAND EXECUTION REQUEST FOR PULL MODEL DEVICES," and listing Claudio DeSanti, Erik Smith, Pawan Singal, and Sakti Lakshmiy R. Paulchamy as inventors, which patent document is incorporated by reference herein in its entirety and for all purposes; and commonly-owned U.S. patent application Ser. No. 17/863,300, filed on 12 Jul. 2022, entitled "SYSTEMS AND METHODS FOR SEND LOG PAGE COMMANDS FOR PULL MODEL DEVICES," and listing Claudio DeSanti, Erik Smith, David Black, Pawan Singal, and Sakti Lakshmiy R. Paulchamy as inventors, which patent document is incorporated by reference herein in its entirety and for all purposes.

In step 825 (also graphically indicated as process ⑥ in FIG. 7), after receiving the zoning information from the PCDC, the first NDC and the second NDC transmit an AEN to the entities impacted by the zoning change, respectively. For example, the first NDC sends a first AEN to the first subsystem, and the second NDC sends a second AEN to the first host.

In step 830 (also graphically indicated as process ⑦ in FIG. 7), in response to receiving the first AEN, the first subsystem sends a first Get Log Page (Discovery Log) command to the first NDC and receives from the first NDC a first response (a first log page); and in response to receiving the second AEN, the first host sends a second Get Log Page (Discovery Log) command to the second NDC and receives from the second NDC a second response (a second log page).

In step 835 (also graphically indicated as process ⑧ in FIG. 7), when the first host processes the second log page, it determines that the first subsystem is available for communication and connects to the first subsystem to perform namespace discovery and utilize the storage capacity as needed.

F. Embodiments of Connectivity Sequences

In one or more embodiments, embodiments of the FDC may also support Subsystem Driven Zoning (SDZ), which is described in commonly-owned U.S. patent application Ser. No. 17/699,005, filed on 18 Mar. 2022, entitled "STORAGE SUBSYSTEM-DRIVEN ZONING PROTOCOL EMBODIMENTS IN A NONVOLATILE MEMORY EXPRESS ENVIRONMENT", and listing Claudio Desanti and David Black as inventors, which patent document is incorporated by reference herein in its entirety and for all purposes.

For example, the first subsystem in the first CSP instance may need to retrieve an available host list that includes the first host from the Colo instance. Since the NDC1 administrator controls which host or hosts are exposed to the PCDC, this may be controlled through a Name Server Synchronization policy. Communication of the Available Host List (AHL) may be accomplished by allowing the name server synchronization to include all host or subsystem entities that have been exposed to the PCDC.

G. System Embodiments

In one or more embodiments, aspects of the present patent document may be directed to, may include, or may be implemented on one or more information handling systems (or computing systems). An information handling system/ computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 9:
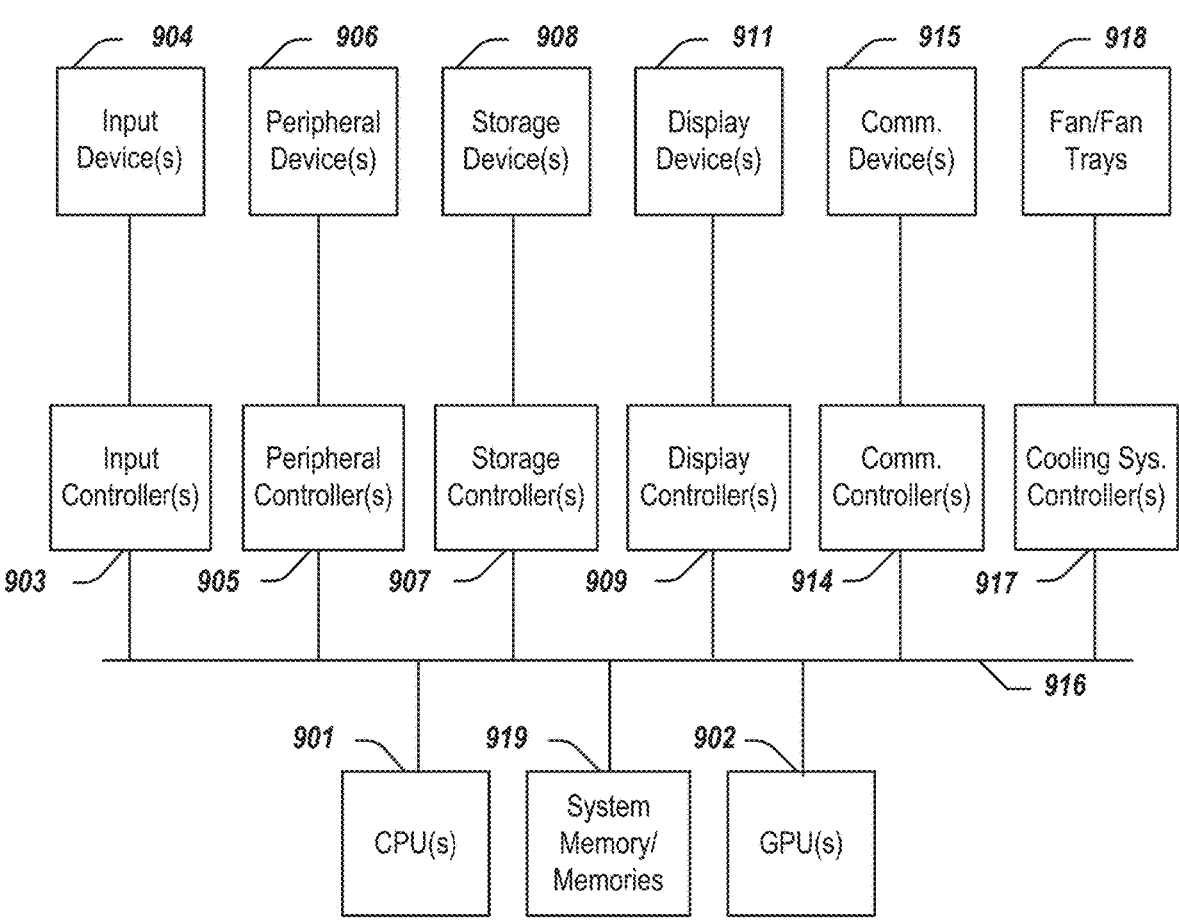
FIG. 9 depicts a simplified block diagram of an information handling system, according to embodiments of the present disclosure.

FIG. 9 depicts a simplified block diagram of an information handling system (or computing system), according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more CPUs 901 that provides computing resources and controls the computer. CPU 901 may be implemented with a microprocessor or the like and may also include one or more graphics processing units (GPU) 902 and/or a floating-point coprocessor for mathematical computations. In one or more embodiments, one or more GPUs 902 may be incorporated within the display controller 909, such as part of a graphics card or cards. The system 900 may also include a system memory 919, which may comprise RAM, ROM, or both.

A number of controllers and peripheral devices may also be provided, as shown in FIG. 9. An input controller 903 represents an interface to various input device(s) 904, such as a keyboard, mouse, touchscreen, stylus, microphone, camera, trackpad, display, etc. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT) display, a thin film transistor (TFT) display, organic light-emitting diode, electroluminescent panel, plasma panel, or any other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 900 comprises one or more fans or fan trays 918 and a cooling subsystem controller or controllers 917 that monitors thermal temperature(s) of the system 900 (or components thereof) and operates the fans/fan trays 918 to help regulate the temperature.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 10:
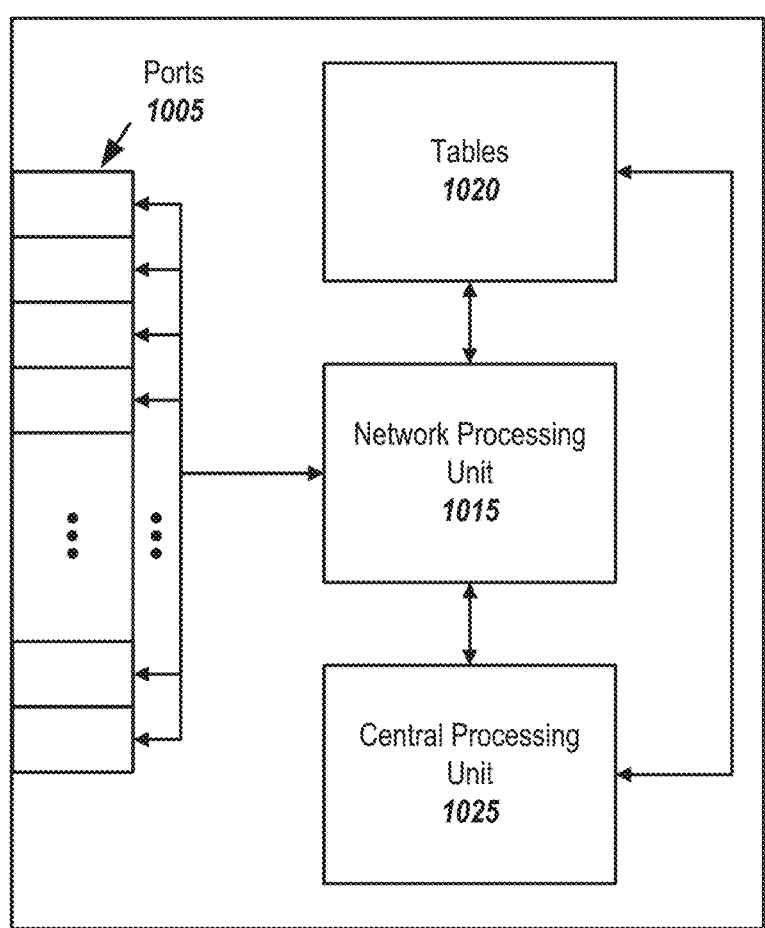
FIG. 10 depicts an alternative block diagram of an information handling system, according to embodiments of the present disclosure.

FIG. 10 depicts an alternative block diagram of an information handling system, according to embodiments of the present disclosure. It will be understood that the functionalities shown for system 1000 may operate to support various embodiments of the present disclosure—although it shall be understood that such system may be differently configured and include different components, additional components, or fewer components.

The information handling system 1000 may include a plurality of I/O ports 1005, a network processing unit (NPU) 1015, one or more tables 1020, and a CPU 1025. The system includes a power supply (not shown) and may also include other components, which are not shown for sake of simplicity.

In one or more embodiments, the I/O ports 1005 may be connected via one or more cables to one or more other network devices or clients. The network processing unit 1015 may use information included in the network data received at the node 1000, as well as information stored in the tables 1020, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize that no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. A computer-implemented method comprising:

given a multi-cloud environment comprising:

a primary centralized discovery controller (PCDC) instance at a first cloud location, in which the PCDC instance comprises a PCDC with a PCDC IP address; and one or more non-primary discovery controller (NDC) instances, in which each NDC instance is at a cloud location that is other than the first cloud location and locations of the other NDC instances and comprises an NDC with an NDC IP address and an entry of the PCDC IP address used for connection to the PCDC:

establishing a bi-directional connection between the PCDC and each NDC of the one or more NDC instances using steps, for each NDC, comprising:

establishing, at the NDC, an NDC-to-PCDC transport connection using the PCDC IP address;

sending, from the NDC, a Non-Volatile Memory Express (NVMe) connect command to the PCDC to establish an NDC-to-PCDC persistent connection, the NVMe connect command comprising a source IP address;

establishing with at the PCDC a PCDC-to-NDC transport connection, in which PCDC-to-NDC transport connection is established using the source IP address; and receiving, from the PCDC, an NVMe connect command at the NDC to establish a PCDC-to-NDC persistent connection.

2. The computer-implemented method of claim 1 further comprising:

configuring, for each NDC, a scope of sharing regarding end-devices connected to the NDC, the scope of sharing comprising: none, all, or selected;

wherein:

the scope of none indicates that no name server entries are shared from the NDC to the PCDC, the scope of all indicates that all name server entries are shared from the NDC to the PCDC, and the scope of selected indicates that only name server entries that have been specifically selected for sharing are shared from the NDC to the PCDC.

3. The computer-implemented method of claim 1 wherein the first cloud location for PCDC deployment is a customer's data center.

4. The computer-implemented method of claim 1 wherein establishing a bi-directional connection between the PCDC and each NDC comprises:

sending, from the NDC to the PCDC, at least one asynchronous event request (AER) that may be used by the PCDC to notify the NDC if a change associated with the NDC has occurred; and receiving, from the PCDC, at least one AER that may be used by the NDC to notify the PCDC if a change has occurred.

5. The computer-implemented method of claim 1 further comprising:

synchronizing name server databases between the PCDC and the NDC after the bi-directional connection is established.

6. The computer-implemented method of claim 5 wherein synchronizing name server databases is controlled by a name server synchronization policy and is accomplished using one or more of the following mechanisms:

sending, from the NDC to the PCDC, host and subsystem entries being shared with the PCDC;

using, by the NDC, an asynchronous event notification (AEN) to notify the PCDC that an update to a discovery log page has been made to trigger the PCDC to retrieve name server entries being shared with the PCDC;

using, by the NDC, a north bound interface (NBI) of the PCDC instance to access an application program interface (API) of the PCDC to make a change or changes to the name server of the PCDC via the API; or using, by the NDC via an NBI of the PCDC instance, a remote procedure call that makes one or more changes to the name server of the PCDC.

7. The computer-implemented method of claim 1 further comprising:

connecting an NDC deployed in a source location to another NDC in a destination location via the PCDC for desired data movement.

8. The computer-implemented method of claim 7 wherein the NDC deployed in the source location functions as a host and the NDC deployed in the destination location functions as a subsystem.

9. The computer-implemented method of claim 1 wherein the one or more NDCs are centralized discovery controllers (CDCs).

10. A computer-implemented method comprising:

given a multi-cloud operating environment with a primary centralized discovery controller (PCDC) at a first location, a first non-primary discovery controller (NDC) at a second location, and a second NDC at a third location, performing steps comprising:

receiving, at the PCDC from the first NDC, connectivity information for a first subsystem that is connected and registered to the first NDC;

receiving, at the PCDC from the second NDC, connectivity information for a first host that is connected and registered to the second NDC;

zoning, at the PCDC, the first host and the first subsystem together;

sending, from the PCDC to the first NDC, zoning information and connectivity information about the first host causing the first NDC to send a first Asynchronous Event Notification (AEN) to the first subsystem and to receive a first get log page command from the first subsystem; and sending, from the PCDC to the second NDC, zoning information and connectivity information about the first subsystem causing the second NDC to send a second AEN to the first host and to receive a second get log page command from the first host.

11. The computer-implemented method of claim 10 further comprising:

receiving, at the first subsystem from the first NDC, a first response regarding the first get log page command;

receiving, at the first host from the second NDC, a second response regarding the second get log page command;

determining, at the first host, that the first subsystem is available for communication; and connecting to the first subsystem to perform namespace discovery and utilize storage capacity.

12. The computer-implemented method of claim 10 wherein the PCDC has bi-directional connections to the first NDC and the second NDC.

13. The computer-implemented method of claim 11 wherein the first response is a first log page, and the second response is a second log page.

14. The computer-implemented method of claim 10 wherein zoning, at the PCDC, the first host and the first subsystem together comprises:

creating, by the PCDC, a first zone containing the first host and the first subsystem;

creating, by the PCDC, a first zone group containing the first zone; and activating the first zone group.

15. An information handling system comprising:

one or more processors; and a non-transitory computer-readable medium or media comprising one or more sets of instructions which, when executed by at least one of the one or more processors, cause steps to be performed comprising:

receiving, at a primary centralized discovery controller (PCDC) deployed at a first location, connectivity information for a first subsystem that is connected and registered to a first non-primary discovery controller (NDC) that is deployed at a second location;

receiving, at the PCDC, connectivity information for a first host that is connected and registered to a second NDC that is deployed at a third location;

zoning, at the PCDC, the first host and the first subsystem together;

sending, from the PCDC to the first NDC, zoning information and connectivity information about the first host; and sending, from the PCDC to the second NDC, zoning information and connectivity information about the first subsystem.

16. The information handling system of claim 15 wherein zoning, at the PCDC, the first host and the first subsystem together comprises:

creating, by the PCDC, a first zone containing the first host and the first subsystem;

creating, by the PCDC, a first zone group containing the first zone; and activating the first zone group.

17. The information handling system of claim 15 wherein the first location is a customer data center.

18. The information handling system of claim 15 wherein the PCDC has a bi-directional connection to each of the first NDC and the second NDC.

19. The information handling system of claim 18 wherein:

for communication that is initiated by the PCDC, a connection where the PCDC acts as a host and the first or second NDC acts as a controller is used; and for communication that is initiated by the first or second NDC, a connection where the first or second NDC acts as a host and the PCDC acts as a controller is used.

20. The information handling system of claim 19 wherein the non-transitory computer-readable medium or media further comprises one or more sequences of instructions which, when executed by at least one of the one or more processors, cause steps to be performed comprising:

receiving, at the PCDC from the first and second NDCs, host and subsystem entries being shared with the PCDC for synchronizing name server databases between the PCDC and the first or second NDC.

* * * * *